No. 836,027. PATENTED NOV. 13, 1906.
J. J. GERBER.
FLEXIBLE SPOUT.
APPLICATION FILED FEB. 13, 1906.

WITNESSES

INVENTOR
JAMES J. GERBER
BY
HIS ATTORNEYS

UNITED STATES PATENT OFFICE.

JAMES J. GERBER, OF MINNEAPOLIS, MINNESOTA.

FLEXIBLE SPOUT.

No. 836,027.  Specification of Letters Patent.  Patented Nov. 13, 1906.

Application filed February 13, 1906. Serial No. 300,899.

*To all whom it may concern:*

Be it known that I, JAMES J. GERBER, of Minneapolis, Hennepin county, Minnesota, have invented certain new and useful Improvements in Flexible Spouts, of which the following is a specification.

My invention relates to spouts used for conducting grain or other material to or from a bin or car or other receptacles; and the object of my invention is to provide a spout composed of a series of flexibly-connected sections, any one of which may be easily and quickly detached from the spout for the purpose of substitution or repairs.

The invention consists generally in a spout composed of a series of telescoping sections or tubes and means detachably securing said sections to flexible connecting means.

Figure 2:
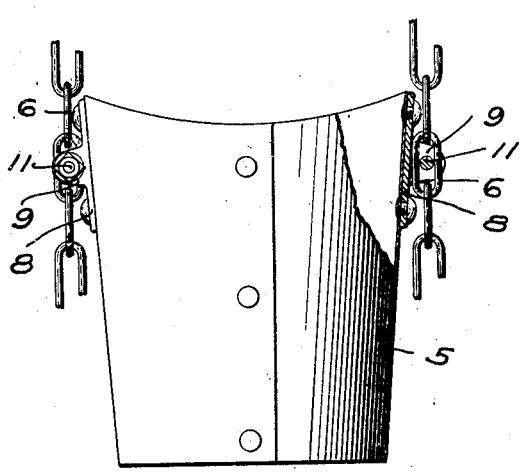
Figure 1:
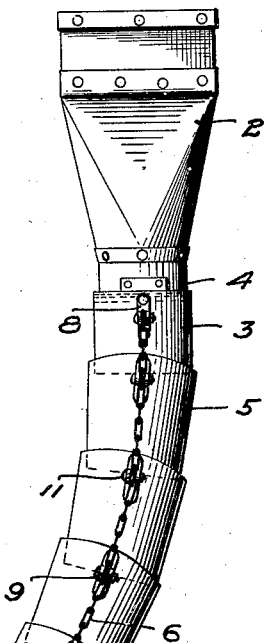
Figure 3:

In the accompanying drawings, forming part of this specification, Figure 1 is a side elevation of a flexible spout embodying my invention. Fig. 2 is a detail view of one of the sections removed from the spout and showing the means employed for attaching the section to the flexible connecting means between them. Fig. 3 is a detail perspective view of the attaching means.

In the drawings, 2 represents the lower end of a conductor or chute whereon the upper spout-section 3 is swiveled at 4 in the usual manner. Below the spout section 3 are a series of telescoping spout sections or tubes 5, composed, preferably, of sheet metal of suitable gage and tubular in form and tapered slightly from their upper toward their lower ends, the smaller end of each section fitting within the larger end of the contiguous section, as shown. This, however, is a common construction in spouts of this type, and I make no claim in this application to a grain-spout composed of telescoping sections and arranged in this way. It has been customary, however, in spouts of this type to provide chains connecting the spout-sections with one another and securing these chains by bolts or rivets permanently to the walls of the sections. When bolts are used as a securing means for flexible connections, the heads will be on the inside of the tubes, and when the sections are telescoped or in use the heads of the bolts near the larger ends of the sections will be covered by the smaller ends of the sections fitting within said larger ends, and consequently it will be practically impossible to obtain access to the bolts should it be necessary to detach one of the spout-sections from the flexible connections and remove it from the spout without taking the entire spout apart.

To avoid this difficulty and annoyance incident to the use of the ordinary connecting means, I provide chains 6, connecting the upper spout-section 3 with the lower or mouth section 7 and mount on each intermediate section a pair of plates 8, having lugs or ears 9 provided with holes 10 to receive bolts 11. These bolts are inserted through the links of the chains 6 and will securely hold the spout-sections in their proper relative position, the plates 8 being secured to the sections by rivets or other suitable means. Whenever it is desired to remove a spout-section, the bolts 11, connecting that particular spout-section with the chains, will be taken out, and then the section can be readily separated from the others and a new one put in place thereof, if desired.

I am aware that different devices may be employed for securing the spout-sections to the connecting-chains, which will permit the convenient detaching of the sections from the chains on the outside of the spout, and I therefore do not wish to be confined to the particular means herein shown and described, as my invention includes any securing means on the outside of the spout-sections which will allow the separation of any section from the chains without disturbing the connections between the chains and the other sections.

I claim as my invention—

1. A flexible grain-spout comprising a series of telescoping sections in combination with plates secured on said sections and having outwardly-projecting ears, chains forming continuous connections between said sections, and bolts detachably fitting within holes in said ears and projecting through links in said chains, substantially as described.

2. The combination with a fixed conductor having a swiveled spout-section at its lower end and chains secured to said spout-section, of a series of telescoping spout-sections, plates mounted on said spout-sections and having outwardly-projecting ears between which the links of said chains are inserted, and bolts passing through holes in said ears and through said links and detachably connecting said sections and said chains, substantially as described.

3. A flexible spout having a series of telescoping sections in combination with flexible means forming a continuous connection between said sections and means for detachably securing said sections to said connecting means, said sections telescoping in one another sufficiently to allow any section intermediate to the ends of the spout when detached from said connection, to be removed, whereby any one or more of said sections may be detached from the spout without disturbing the connections between said connecting means and the other sections, substantially as described.

4. A flexible spout having a series of telescoping sections in combination with flexible means forming a continuous connection between said sections, and means for detachably securing said sections to said connecting means, the lower end of each section fitting loosely into the upper end of the section next below when said connection is extended or straightened, whereby said spout is capable of longitudinal expansion and contraction, and whereby any section intermediate to the ends of the spout can be removed when detached from said connection without disturbing the connection between said connecting means and the other sections.

5. A flexible spout having a series of telescoping sections, plates mounted on said sections and having outwardly-projecting ears, chains connecting said spout-sections and having their links fitting between the ears of said plates and means for detachably securing the links of said chain to said ears, substantially as described.

In witness whereof I have hereunto set my hand this 9th day of February, 1906.

JAMES J. GERBER.

Witnesses:
RICHARD PAUL,
C. MACNAMARA.